United States Patent [19]

Zumbé et al.

[11] Patent Number: 5,238,698
[45] Date of Patent: Aug. 24, 1993

US005238698A

[54] PRODUCT AND PROCESS FOR PRODUCING MILK CHOCOLATE

[75] Inventors: Albert Zumbé, Neuchatel; Caroline Grosso, Corcelles, both of Switzerland

[73] Assignee: Jacobs Suchard AG, Zurich, Switzerland

[21] Appl. No.: 899,810

[22] Filed: Jun. 17, 1992

[51] Int. Cl.⁵ .............................................. A23G 1/00
[52] U.S. Cl. ................................... 426/572; 426/631; 426/660
[58] Field of Search ............... 426/631, 804, 660, 607, 426/548, 572

[56] References Cited

U.S. PATENT DOCUMENTS

| | | | |
|---|---|---|---|
| 4,287,216 | 9/1981 | Mangano | 426/660 |
| 4,323,588 | 4/1982 | Vink | 426/660 |
| 4,889,738 | 12/1989 | Hara | 426/572 |
| 4,980,189 | 12/1990 | Keme | 426/660 |
| 5,004,623 | 4/1991 | Giddey | 426/572 |
| 5,017,392 | 5/1991 | Bombardier | 426/548 |
| 5,063,080 | 11/1991 | Kruger | 426/804 |

FOREIGN PATENT DOCUMENTS 2-207743 8/1990 Japan .................................. 426/572

*Primary Examiner*—Carolyn Paden
*Attorney, Agent, or Firm*—Linn I. Grim

[57] ABSTRACT

A product and process is provided for producing a lower density milk chocolate composition, substantially free of sucrose and having the taste and mouthfeel of a traditional milk chocolate. Here the milk chocolate composition is aerated with an inert gas under a pressure of about 1.2 about 8 bar at temperature of 27° C. to about 45° C.

14 Claims, No Drawings

PRODUCT AND PROCESS FOR PRODUCING MILK CHOCOLATE

BACKGROUND OF THE INVENTION

The present invention relates to an improved milk chocolate process and product. More specifically, the invention relates to a process for producing a lower density milk chocolate composition substantially free of sucrose and having the taste and mouthfeel of a traditional milk chocolate.

Sucrose-free chocolate for diabetics has long been known wherein sucrose is replaced by sorbitol. Other sugar alcohols similar to sorbitol such as isomalt, lactitol, maltitol, etc., have recently been permitted in foodstuffs including sugar-free milk chocolate compositions. Additionally, edible carbohydrates with lower energy contents than sucrose have been developed which are suitable for inclusion in chocolate. The difficulty in using these carbohydrates and sugar alcohols is achieving flavor, texture and mouthfeel comparable to that of traditional milk chocolate. A typical conventional milk chocolate contains about 31% fat and has a calorie content of about 530 Kcal per 100 grams. By the process of this invention, a normal fat-containing milk chocolate substantially free of sucrose can be produced which has a lower density and lower calorie contents than regular sugar-containing milk chocolate and yet the sucrose-free product of the present invention provides acceptable flavor, texture and mouthfeel similar to conventional milk chocolate.

SUMMARY OF THE INVENTION

In accordance with the present invention, a process is provided for producing a lower density milk chocolate composition, substantially free of sucrose which comprises aerating, with an inert gas, a milk chocolate composition comprising an admixture of cocoa, milk, and edible carbohydrate having a metabolisable calorie content less than that of sucrose and a sweetener wherein the cocoa component comprises cocoa butter and cocoa liquor; the milk component comprises a milk powder with or without fat; the sweetener component comprises a sugar alcohol and the total fat content of said chocolate composition of from about 30 to about 40 weight percent.

DETAILS OF THE INVENTION

The chocolate composition of the present invention is different from the conventional milk chocolate. The chocolate composition of this invention which is substantially free of sucrose is a lower density product than conventional milk chocolate because the chocolate composition is aerated with an inert gas such as nitrogen or carbon dioxide under pressure at about 1.2 to about 8 bar, preferably about 1.5 to about 2.5 bar. At pressures below 1 bar, no substantial amount of gas would remain in the chocolate composition while at levels higher than 8 bar, a poor texture is obtained. The temperatures during the gas injection of the chocolate composition must be maintained between 27° C. to about 45° C., preferably between about 27° C. to about 35° C. If the pressures are too high, the inert gas will not mix with the chocolate composition. The difference in pressure in the unit aerating the chocolate composition and atmosphere permits the gas in the chocolate mass to expand when the mass is poured into the molds and gives the aerated structure (low specific weight of the product).

The product of this invention, because of its chocolate composition, has a lower calorie content than the conventional milk chocolate.

The unusual chocolate composition of this invention is substantially free of sucrose and prepared in such a manner wherein the total fat content ranges about 30 to about 40 weight percent, preferably between about 30 to about 35 weight percent. The ingredients include cocoa, milk, an edible carbohydrate having a metabolisable calorie content less than that of sucrose and a sweetener. The cocoa component comprises cocoa butter and cocoa liquor and modifications thereof. The cocoa component is present in amounts ranging from about 22% to about 40%, preferably from about 25% to about 30%, of the total chocolate composition. The milk component can comprise a milk powder with or without fat. The milk powder can be derived from any milk source such as whole milk, skim milk, milk protein and the like. The amount of the milk component in the chocolate composition can range from about 14% to about 26%, preferably from about 18% to about 22% of the total chocolate composition.

The edible carbohydrates used in this invention have a relatively low metabolisable calorie content. These consist of easily metabolised sugars like glucose and fructose linked together to form polymers by bonds which cannot be split by enzymes in the human body. These carbohydrates are only partially metabolised and can therefore have calorie contents which are lower than that of sugar. Such carbohydrates can include polydextrose, oligofructose, inulin and the like. Polydextrose is a randomly bonded condensation polymer of D-glucose having an upper molecular weight limit typically exceeding 22,000 while oligofructose consists of a mixture of polymers of fructose with a much lower degree of polymerization, the majority being from two to five fructose units. Polydextrose is the preferred edible carbohydrate, however, its inclusion in conventional sugar-free milk chocolate compositions degrades the texture and mouthfeel of the resultant chocolate. These carbohydrates can be present in amounts from about 10% to about 45%, preferably from about 10% to about 26% of the total composition.

The sweetener component can include polyols such as lactitol, isomalt, maltitol, sorbitol, mannitol, xylitol, erythritol and the like and mixtures thereof. These polyols can be present in the chocolate composition from about 5% to about 55%, preferably from about 15% to about 55% depending on the desired reduction in calorie content. The preferred polyols are isomalt, lactitol and maltitol. If additional sweeteners are required, intense sweeteners such as aspartame, sucralose, alitame, acetosulfame K and the like and mixtures thereof can be used in amounts depending on the sweetness level desired.

The presence of the edible carbohydrates such as polydextrose and/or oligofructose with the polyols either singly or in combination with one another provide a chocolate composition which has an inferior flavor, texture and mouthfeel. Surprisingly, the aeration of the chocolate composition of this invention significantly improves the flavor, and mouthfeel of the chocolate composition comparative to that of the conventional milk chocolate but with a highly expanded structure unlike traditional milk chocolate.

In the mixture of the components of the chocolate composition of this invention, emulsifiers such as lecithin, polyglycerol polyricinoleate, ammonium phosphatide and the like can be used. In addition, flavoring agents and any other ingredient conventionally used in milk chocolate compositions can be used. Furthermore, ingredients with low calorie count can be used in the milk chocolates of this invention including cereal fibers, cocoa fibers, vegetable fibers, cellulose such as microcrystalline cellulose, pectins and edible gums.

It will be appreciated that in view of the use of polydextrose and a sugar alcohol, the temperature during conching should be kept at a level below that at which the water of crystallization inherently present in these ingredients is released in order to avoid any undesirable increase in viscosity or agglomeration of the mixture. Conching should therefore generally take place at less than 60° C. and preferably below 45° C. when sugar alcohols are used in the chocolate production. During the refining and conching stages of the manufacture of the chocolate used in the invention, steps must be taken to avoid any significant absorption of moisture in view of the hygroscopic nature of the sugar alcohols used.

The aeration of the chocolate composition used in this invention can be conducted using a continuous or batch type procedure. In a continuous process, the chocolate composition is continuously fed into a hopper under pressure at temperatures in the range from about 30° to about 45° C. The chocolate composition, maintained under pressure, is pumped through a series of pipes, each fitted with static mixer elements. Prior to the first pipe, the inert gas is injected under pressure (about 1 to about 8 bars) into the chocolate composition. This gas-containing composition is pumped in the first pipe for cooling in the initial step in obtaining the desired pre-crystallization of the chocolate. Additional inert gas is pumped into the chocolate in the first pipe. In the second pipe, the chocolate is further cooled and additional inert gas injected. Through the next pipes additional cooling can occur without gas injection and in the final pipes the temperature of the chocolate can be achieved to obtain the desired pre-crystallization properties. The gas containing chocolate composition is pumped into a depositor maintained under pressure generally not exceeding 3 to 5 bars. The chocolate mass, under pressure, is poured into molds. Due to the difference of the pressure between the depositor and atmospheric pressure, the gas in the chocolate mass expands when the mass is poured into the molds and provides an aerated structure (low specific weight of finished product). The aerated structure can be controlled through the pressure of the injected gas, i.e., the final pressure in the depositor. The molds are filled with the aerated and tempered chocolate. Then the molds are cooled and after crystallization, the chocolate bars formed are removed.

Aeration using a batch basis is another suitable means to produce the desired chocolate composition of this invention. The liquid chocolate is poured into a mixer equipped with heating and cooling capabilities. Inert gas can be injected into the chocolate composition which is then heated and/or cooled as required to achieve the desired pre-crystallization properties. The chocolate composition under pressure is then poured into molds at atmospheric pressure to obtain the desired aerated chocolate product.

The following examples illustrate the invention in greater detail.

EXAMPLE 1

Continuous Aeration of Chocolate

Liquid chocolate at a temperature of 35° C. is continuously fed into a hopper. The liquid chocolate is pumped at a rate of up to 500 Kg/hour through a series of pipes with a double jacket in which nitrogen gas is injected into the chocolate by a gas injector. The series of pipes is an installation divided into 6 sections, all equipped with static mixer elements.

Section 1—Temperatures of the chocolate is maintained at 35° C. and nitrogen gas is injected with 6 to 8 bars pressure.

Section 2—Temperature of the chocolate is cooled down to 29° C. and nitrogen gas is injected again.

Section 3-4—Temperature of the chocolate is brought down to 27° C. without gas injection.

Section 5-6—Temperature of the chocolate is brought up to 28.5° C.-29° C. to obtain the desired pre-crystallization.

After Section 6, the chocolate is pumped into a depositor equipped with a lock. The pressure of the depositor is maintained between 1.2 and 3 bar and the temperature of the chocolate is 29° C.

Due to the difference of pressure between depositor and atmospheric pressure, the gas in the chocolate mass expands when the mass is poured into the molds and gives an aerated structure (low specific weight of finished product). The grade of aeration can be controlled through the pressure of injected gas (final pressure in the depositor). The molds are filled with the aerated and tempered chocolate through a chamber lock. The filled molds are cooled and after crystallization, the chocolate bars are removed from the mold.

EXAMPLE 2

Aeration Per Batch

Thirteen kilograms of chocolate at 35° C. are poured into a mixer and the stirrer is started. Nitrogen gas is injected directly into the chocolate. The mixer is equipped with a double jacket with hot and cold water input and output. The chocolate is stirred for 10 minutes with gas pressure of 8 bars, maintaining the temperature of the chocolate mass at 35° C. After this time, the chocolate is cooled to 27° C. and the gas pressure is 8 bars. When the temperature of the chocolate reaches 27° C., the chocolate mass is heated to 29° C. Once 29° C. is reached, the chocolate mass is poured into the molds. After cooling, the chocolate bar is removed from the mold.

In Examples 1 and 2, carbon dioxide can be used in place of nitrogen. Nitrogen however produces finer bubble structure than carbon dioxide in the chocolate product.

EXAMPLE 3

In the preparation of the aerated chocolate products of this invention, the following ingredients in each of the Samples 1 through 4 in Table I were comixed to form the chocolate mass used in the processes of Examples 1 and 2.

TABLE I

| Ingredient | Sample No. | | | |
| --- | --- | --- | --- | --- |
| | 1 % | 2 % | 3 % | 4 % |

TABLE I-continued

| | Sample No. | | | |
|---|---|---|---|---|
| | 1 % | 2 % | 3 % | 4 % |
| Polydextrose | 25.70 | 25.70 | 25.70 | 25.70 |
| Lactitol | 23.51 | 18.51 | 23.51 | 18.51 |
| Cellulose (microcrystalline) | | 5.00 | | 5.00 |
| Cocoa liquor | 11.66 | 11.66 | 8.51 | 8.51 |
| Cocoa butter | 19.47 | 19.47 | 18.44 | 18.44 |
| Butterfat | | | 0.40 | 0.40 |
| Wholemilk powder | 18.44 | 18.44 | 20.69 | 20.69 |
| Hazelnut paste | 0.50 | 0.50 | 2.00 | 2.00 |
| Lecithin | 0.50 | 0.50 | 0.50 | 0.50 |
| Aspartame | 0.20 | 0.20 | 0.20 | 0.20 |
| Vanillin | 0.02 | 0.02 | 0.05 | 0.05 |
| Nutritional content | | | | |
| Fat (%) | 31.5 | 31.5 | 30.6 | 30.6 |
| Energy kcal/100 g | 424 | 412 | 420 | 408 |

All Samples 1 through 4, without aeration, had flavor, texture and mouthfeel inferior to conventional chocolate. After aeration, the Samples had a more acceptable flavor, texture and mouthfeel similar to conventional milk chocolate. It should also be noted that each Sample in Table I has significantly lower calories than the conventional milk chocolate containing about 31% fat having about 530 Kcal per 100 grams.

We claim:

1. A process for producing a lower density milk chocolate composition substantially free of sucrose, which comprises aerating with an inert gas, under pressure at about 1.2 to about 8 bar being at temperatures in the range of about 27° C. to about 45° C., a chocolate composition comprising an admixture of cocoa, milk, an edible carbohydrate having a metabolisable caloric content less than that of sucrose and a sweetener wherein the cocoa component comprises cocoa butter and cocoa liquor, the milk component comprises a milk powder and butter fat, the sweetener component comprises a sugar alcohol, and the total fat content of said chocolate composition is from about 30 to about 40 weight percent.

2. The process of claim 1 wherein the inert gas is selected from the group consisting of nitrogen and carbon dioxide.

3. The process of claim 1 wherein the total fat content of the milk chocolate composition is from about 30 to about 35 weight percent, the sugar alcohol is selected from the group consisting of lactitol and maltitol, and the inert gas is selected from the group consisting of nitrogen and carbon dioxide.

4. The process of claim 3 wherein the inert gas is nitrogen, the cocoa component comprises cocoa butter and cocoa liquor, the edible carbohydrate is polydextrose and sugar alcohol is lactitol and the inert gas is nitrogen.

5. The process of claim 4 wherein the sugar alcohol is maltitol.

6. The process of claim 5 wherein aspartame is combined with maltitol.

7. The product of the process of claim 6.

8. The product of the process of claim 5.

9. The process of claim 4 wherein aspartame is combined with lactitol.

10. The product of the process of claim 9.

11. The product of the process of claim 4.

12. The process of claim 3 wherein an intense sweetener is combined with said sweetener.

13. The product of the process of claim 3.

14. The product of the process of claim 1.

* * * * *